Feb. 17, 1942.  S. HANSEN  2,273,317
ELECTRIC GOVERNOR OR THROTTLING MEANS
Filed Nov. 14, 1938  3 Sheets-Sheet 1
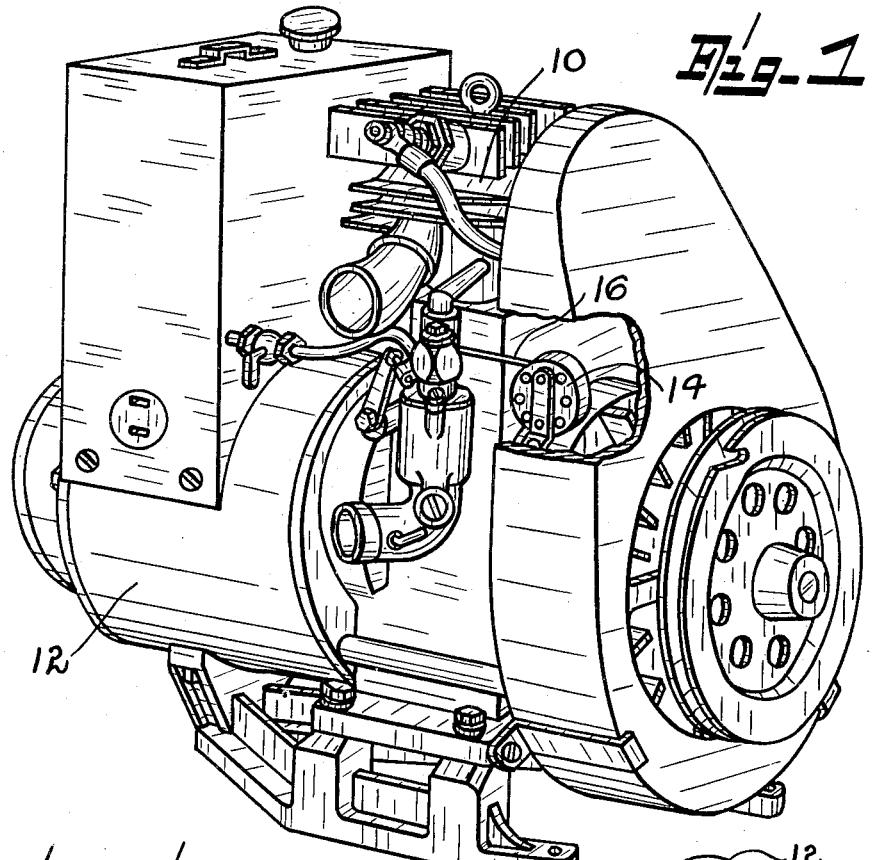
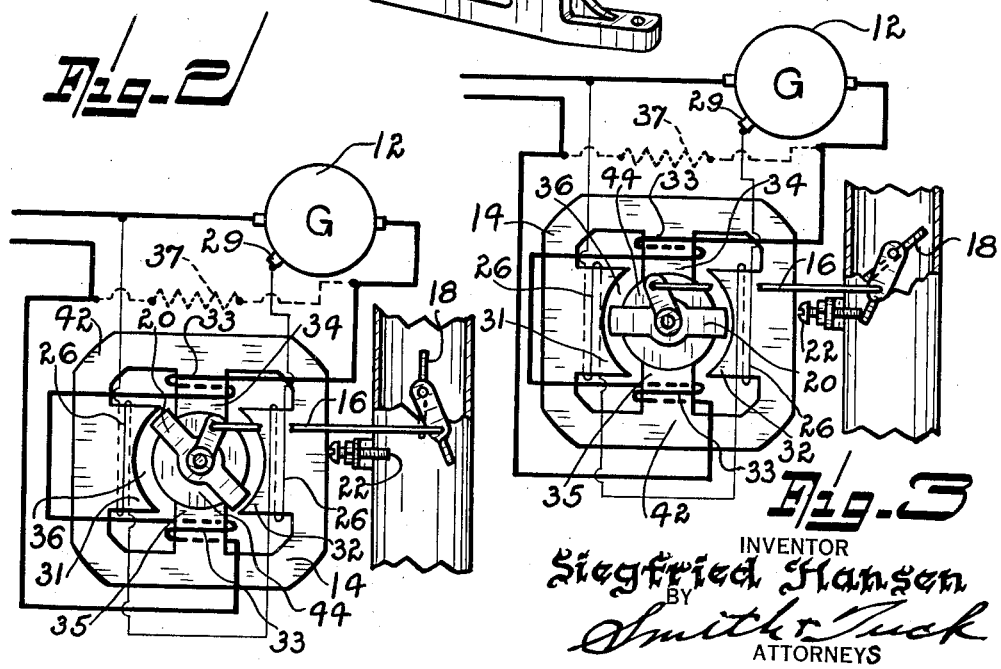
INVENTOR
Siegfried Hansen
BY
Smith Tuck
ATTORNEYS

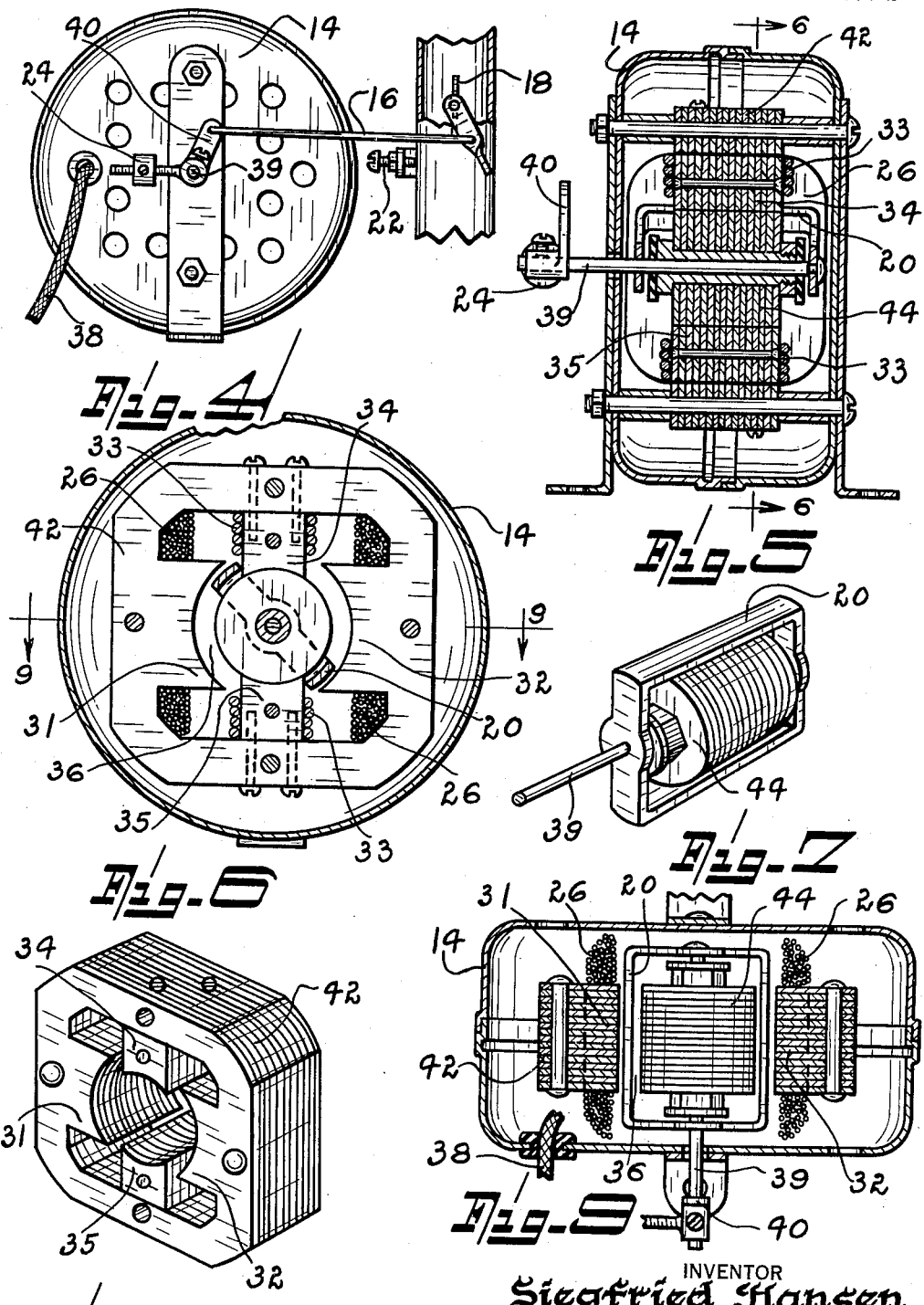

Patented Feb. 17, 1942

2,273,317

UNITED STATES PATENT OFFICE 2,273,317

ELECTRIC GOVERNOR OR THROTTLING MEANS

Siegfried Hansen, Schenectady, N. Y.

Application November 14, 1938, Serial No. 240,368

5 Claims. (Cl. 290—40)

My present invention relates broadly to electric generators and their prime movers, and in particular to a novel and efficient though simple electric governor or throttling means for controlling the power developed by the prime mover.

In the art of electric power generation, it is usually necessary to control power developed by the prime mover in accordance with the power drawn from the electric generator. It, therefore, becomes necessary to employ apparatus which may be acted upon by the load and will in turn act upon the energy flow into the prime mover in the same sense.

Briefly, my invention consists of correlating the interaction of three electro-magnetic fields to produce a throttling effect in the prime mover. Two of these fields may be termed "inducing fields" while the third one is an "induced field" created by either one or both of the first two. For clarity of explanation, one of the inducing fields, being a function of the generator voltage, will be designated as the "voltage" field; the second inducing field, being a function of the load current, will be designated as the "current" field, and the induced field will be designated as the "armature" field, which is a function of either one of the other fields, or both, and in addition is also a function of the armature's position with relation to the other fields.

The reaction, or force, developed between the induced and the inducing fields causes the armature to assume a particular position for each given load on the generator. By suitable linkage, the armature is coupled to the throttle valve of the prime mover in such a way that any change of load on the generator will immediately change the fuel supply to the prime mover either by increasing or decreasing the same so as to maintain a substantially uniform output voltage from the generator between the limits of no load and full load.

The principal object of my invention, therefore, is to provide a voltage governing device which is controlled by both the output voltage and current from an alternating current generator and to couple the movable armature of my governing means to the throttling means of the prime mover driving the generator.

Other and more specific objects will be apparent from the following description taken in connection with the accompanying drawings wherein Figure 1 is a perspective view showing one type of generating units to which my device is adaptable.

Figures 2 and 3 are views partly diagrammatic and partly in elevation showing the two extreme positions in the operation of my governor.

Figure 4 is an end elevation of my governor showing the same as connected to the throttle valve of an internal combustion engine, certain parts being shown in section.

Figure 5 is an elevation in section through my governor.

Figure 6 is a sectional view taken along the line 6—6 of Figure 5.

Figure 7 is a perspective view showing the armature of my governor, and the armature core.

Figure 8 is a perspective view showing the laminations making up the stator portion of my governor.

Figure 9 is a cross-sectional view through my governor taken as along line 9—9 of Figure 6.

Figure 10:
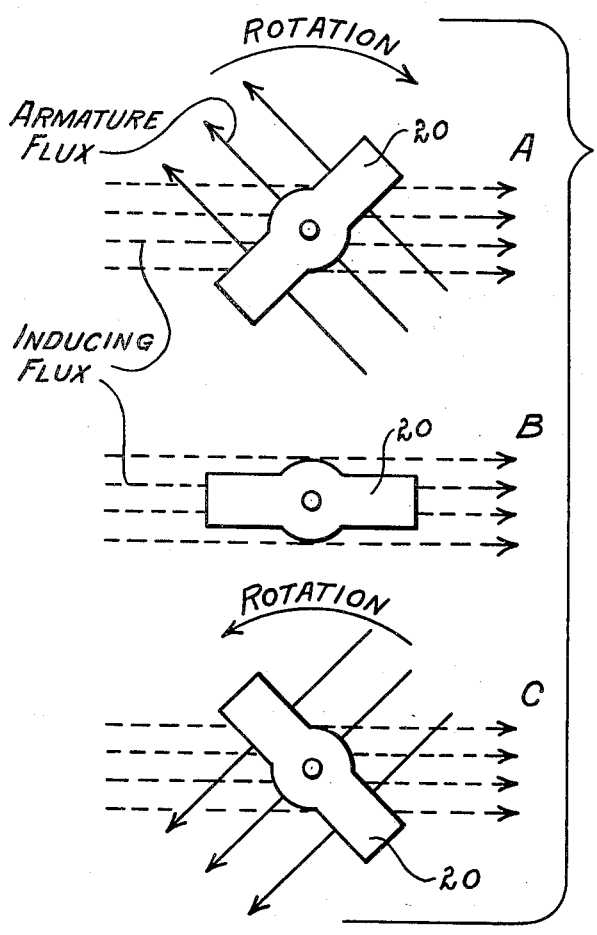
Figure 10 shows three positions of the armature relative to the inducing flux, and the induced armature flux in each case.

Referring to the drawings, throughout which like reference characters indicate like parts; the essential features shown in Figure 1 are the four-cycle internal combustion engine 10, generator 12, the governing mechanism 14, and the governor control rod 16 linking governor 14 to the carburetor throttling valve 18.

In Figure 2 the governor armature is in the full load position. The carburetor throttle valve 18 is wide open in Figure 2, while in Figure 3 the load has decreased to zero value thus rotating the armature 20 and closing the throttle 18 to the idling position, which position has been predetermined by set screw 22. A light spring or counterweight 24 may be used to assist the closing of the valve.

In both Figures 2 and 3 the voltage coils 26 are shown connected in series from one side of the generator output at 27 to the special governor brush 29. The voltage coils excite the poles 31 and 32. The current coils 33 are in series with the load as shown in heavy lines and they excite the poles 34 and 35. The air gap 36 allows rotation of the armature 20 through about 90 degrees, although in the figures shown, a 45 degree swing effects full control. The resistance shunt 37 shown in dotted lines may be used to adjust the current through the current coils.

Figure 4 shows a more detailed view of the linkage between the governor and the throttling valve of the carburetor. The governor 14 in Figure 4 receives its alternating current energy through the cable shown at 38. An extension of the armature shaft at 39 has a crank arm 40 mounted thereon. Said crank arm 40 being linked through rod 16 to the throttle valve 18 which is located in the carburetor manifold. With decreasing load, the arm 40 on the governor 14 will tend to rotate in a counter-clockwise direction, thus causing the carburetor throttle valve 18 to close and allow less fuel to flow to the engine. Conversely, an increasing load would have the reverse action and open the throttle valve 18 to the position shown.

Referring to Figure 5, the extension of the shaft at 39 and the crank arm 40 are shown in more detail. The voltage coils are indicated at 26, and the armature coil at 33.

Figure 6 shows the relative positions of the voltage coils 26 on their poles 31 and 32, the current coils 33 on their poles 34 and 35 as located on the laminated iron field piece 42. The copper armature coil 20 is shown as being free to rotate about the laminated iron armature core 44 through approximately 90 degrees.

In Figure 9, the voltage coils 26 are shown as located on the laminated stator 42. The armature coil 20 with its shaft extension 39 is also shown and the armature core 44 with the air-gap between it and the voltage poles 31 and 32 of the stator 42.

Both of the inducing fields which pass through the armature core 44 in Figure 6 lie in the same plane, are in space quadrature, and in approximately time phase, assuming a load of approximately unity power factor. When there is no current field, the armature coil 20, a closed rectangular inductor ring of copper, being free to rotate within limits about an axis included in its plane, shown as shaft 39 in Figure 7, will tend to orient itself in such a way that its induced field would be a minimum and at right angles to the inducing field, which in this instance would be the voltage field. Or in other words, the plane of the armature coil 20 would become parallel to the magnetic flux traversing the voltage poles 31 and 32, the air-gaps 36, and the armature core 44 in Figure 6. When a load is applied to the generator, the current field traversing the current poles 34 and 35 and the armature core 44 in Figure 6 will react with the voltage field to produce a resultant magnetic field in the armature core and lying at some angle between the axes of the current and voltage fields. Again, the armature coil will endeavor to align its plane parallel to the resultant magnetic flux. Thus, for various degrees of load, the resultant magnetic field will occupy different positions but in each case the armature coil will tend to align its plane with the resultant field.

Figure 12:
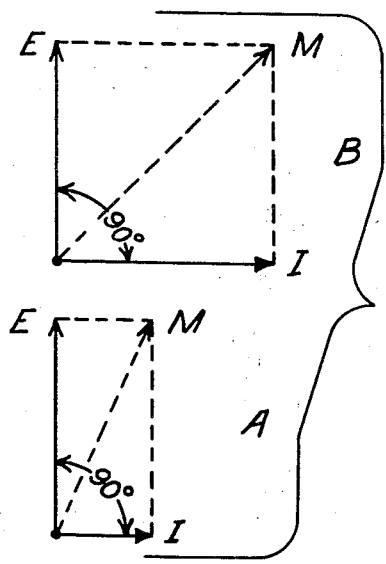
Figure 12 is a vector diagram for explaining how the resultant magnetic field rotates with a change of load.

The reaction between the armature flux and the resultant or inducing flux may best be described by referring to Figure 10, while the change of position of the resultant or inducing flux for various loads may best be explained by means of Figure 12.

In Figure 10 the resultant field or inducing flux is shown linking the armature coil 20 and also the armature flux for different positions of the armature coil. In Figure 10a if the field flux is increased in the direction shown by the dashed arrows, the induced current in the armature 20 will produce an armature flux with the direction shown by the solid arrows. It is obvious then that the armature flux has a component which tends to oppose the field flux. Such opposition between the two fluxes will produce rotation as shown in a clockwise direction. This rotation would continue until the copper armature coil 20 assumed the position as shown in 10b. In this position there would be no field flux linking through the copper armature coil 20 and there would be no armature flux induced. However, if the armature coil 20 were rotated beyond the position in 10b until it assumed the position shown in 10c, then the armature flux will have reversed in direction and will be as shown by the solid arrows. Again there is a component which opposes the field flux and the tendency to rotate would be counter-clockwise until the armature coil 20 again assumed the position as shown in 10b. In other words, the armature coil 20 will always tend to rotate in such a manner that its plane will become parallel to the magnetic lines of inducing flux produced by the field as shown in 10b. This reaction between the armature coil and the field flux may be more readily explained by quoting Lenz's law. "The generated electromotive force always tends to send a current in such a direction as to oppose the change in flux which produces it."

Figure 11:
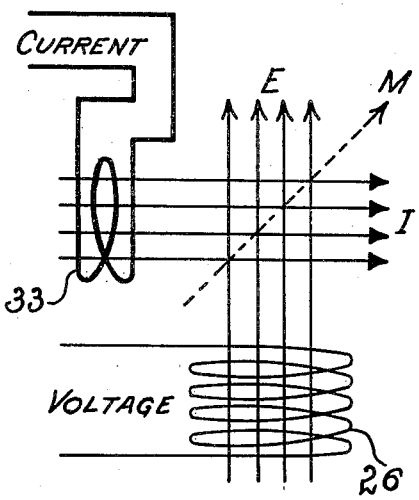
Figure 11 is a schematic diagram showing the space relations of the voltage field and the current field.

In Figure 11 the magnetic fields of the voltage coil and of the current coil are shown in space quadrature as they actually are in the governor. The current flux I is indicated by the solid headed arrows while the voltage flux E is indicated by the open headed arrows. For simplicity in these drawings, one of each of the voltage coils and current coils is omitted. These two magnetic fluxes, E and I, respectively, being in space quadrature and in approximately time phase will cooperate to produce a resultant magnetic flux as shown by the dotted arrow M.

The position of the resultant flux M is best explained by the vector diagrams of Figure 12. It should be remembered that these vector diagrams are concerned only with space phase relations between the voltage, and current fields, since it is assumed that these fields have approximately identical time phase. In Figure 12a the vector diagram represents conditions existing with a small load on the generator. Therefore, the flux vector I is relatively short while the flux vector E has its normal length. By completing the parallelogram, the position of the resultant vector M is determined. If the current vector should shrink to zero, as with no load, it is obvious that the resultant vector M would coincide with the voltage vector E.

With an increase of load as indicated by the extension of the current vector I in Figure 12b, it is obvious that the resultant magnetic vector M has moved considerably away from the voltage vector E. In other words, the position of the resultant magnetic vector M is a function of both the load current drawn from the generator and its output voltage. It is this resultant magnetic flux vector linking the armature coil 20 and reacting with the induced armature flux as shown in Figure 10, that causes a movement of the armature coil 20 in such a direction that the plane of the armature coil becomes parallel to the magnetic vector M. Thus, with an increase of load, the armature coil 20 assumes a new position and as a result opens the throttle valve 18 of the carburetor and supplies the engine with more fuel to compensate for the increased load thereon.

The voltage coil 26 having a large number of turns would naturally draw a lagging current relative to the output voltage of the generator. Assuming a resistive load, a considerable phase angle would result between the voltage flux and the current flux in the governor stator. Since these two fluxes should be approximately in time phase it is necessary to compensate in some manner for the lagging current in the voltage coil. This may be accomplished in many ways, such as a condenser or resistance in series with the voltage coil. In this particular instance, a special winding was put in the armature of the alternating current generator. To compensate for this lagging current, the special governor winding in the armature of the generator was so wound as to produce a voltage leading the alternating output voltage by the same angle as the lagging current drawn by the voltage coil of the governor. Since it is really the current flowing through the voltage coil which produces its magnetic flux, the flux so produced was approximately in phase with the alternating voltage output of the generator. Although a resistive load has been assumed, the reaction of the governor and generator are such as to give good governing action on leading or lagging loads.

In the alternating current generator armature one terminal of the power winding is common with one terminal of the special governor winding, while the other terminal of the special governor winding is brought out through a special brush as shown at 29 in Figures 2 and 3 in the drawings.

Since the two sets of coils are at right angles, there is no coupling between them. Hence the compounding of the governor may be adjusted by a shunt 37 across the current coil without any circulating current being set up.

If a condenser is used in series with the voltage coils its capacity should be about three-fourths of that required to produce resonance at 60 cycles. Thus the current in the voltage coils will always increase with the speed of the generator; producing a satisfactory governing action.

Since the action of this governor depends on current induced in the copper band, it is evident that this governor can only be used in connection with alternating current generators.

Although copper has been mentioned as the material used for the armature coil, any other non-magnetic electrically conducting material could be used in place of copper. The specific application described herein concerns a single phase generator but this governing device could very readily be used on any polyphase system without departing from the scope of this invention. Furthermore, the mechanical details could be altered considerably to fit certain other applications, without changing the basic concept involved.

In this particular application of the governor its purpose is to maintain an approximately constant voltage, but to those versed in the art it should be apparent that the governor could be used to maintain an approximately constant current in a properly designed generating system, and still be well within the scope of this invention. Furthermore, instead of controlling fuel flow to an internal combustion engine, this type of governor could be used to control the energy flow into any type of prime mover such as water to a wheel, steam to a turbine, or any similar application.

The foregoing description and the accompanying drawings are believed to clearly disclose a preferred embodiment of my invention but it will be understood that this disclosure is merely illustrative and that such changes in the invention may be made as are fairly within the scope and spirit of the following claims:

I claim:

1. In an electric power generating system of the class wherein a variable speed prime mover drives a bi-phasic alternating current generator comprising a power phase circuit and a governing phase circuit, said phases being mutually inductive, and electro-responsive governing means electrically excited by the electrical load and the governing phase circuit reacts upon the energy supply to the prime mover to increase or decrease the speed thereof thereby maintaining essentially constant voltage output regardless of load variations, the combination of said governing phase inductively coupled to said power phase within said generator, with said governing means having a stator field circuit electrically connected in shunt to the governing phase circuit of the generator and a second stator field circuit electrically connected serially in the power phase circuit of said generator, and said two stator circuits of governing means arranged to be non-mutually inductive.

2. In an electric power generating system of the class wherein a variable speed prime mover drives an alternator and electro-responsive governing means actuated in part by a voltage generated in the alternator and in part by the electrical load current reacts upon the energy supply to the prime mover to increase or decrease the speed thereof thereby maintaining essentially constant voltage output regardless of load variations, the combination of an alternator having a power phase and a governing phase, said phases being spaced less than 90 electrical degrees within said alternator, with electro-responsive governing means including a stator winding electrically connected across the governing phase of the alternator and a second stator winding electrically connected serially between the power phase of said alternator and an electrical load, and said stator windings of governing means arranged to be non-mutually inductive.

3. In an electric power generating system of the class wherein a variable speed internal combustion engine drives an alternating current generator and an electrodynamic governing means actuated by the electrical load reacts upon the fuel supply to the engine to increase or decrease the speed thereof thereby maintaining essentially constant voltage output regardless of load variations, the combination of a bi-phaseal generator having a power phase winding and a governing phase winding, said windings being mutually inductive within said generator, with electrodynamic governing means having a stator winding electrically connected across the governing phase winding of the generator and a second stator winding electrically connected serially between the power phase winding of said generator and an electrical load, and said stator windings of governing means arranged to be non-mutually inductive.

4. In an electrical governing system of the class wherein a variable speed internal combustion engine drives an alternating current generator and electrodynamic governing means actuated by the electrical load reacts upon the fuel supply to the engine to increase or decrease the speed in consonance with load variations thereby maintaining essentially constant voltage output regardless of load variations, the combination of windings of a bi-phaseal generator having a power phase winding and a governing phase winding, said windings being mutually inductive within said generator, and having an electrical angle between them greater than zero degrees, but less than 90 degrees with electrodynamic governing means having a stator winding electrically connected across the governing phase winding of a generator and a second stator winding electrically connected serially between the power phase winding of said generator and an electrical load, said stator windings of governing means arranged to be non-mutually inductive, and a rotor circuit inductively coupled to both stator circuits.

5. In an electrical governing system of the class wherein a variable speed internal combustion engine including a fuel throttle drives a bi-phasic alternator comprising a power phase circuit and a governing phase circuit, said phases being mutually inductive, and electrodynamic governing means actuated by the electrical load current and the governing phase voltage reacts upon the fuel throttle of the engine to increase or decrease the speed in consonance with load variations thereby maintaining essentially constant voltage output regardless of load variations, the combination of said inductively coupled phase circuits within said generator, with electrodynamic governing means having at least one stator coil electrically connected in shunt to the governing phase circuit of the generator and at least one other stator coil electrically connected serially in the power phase circuit of said generator, said stator coils of governing means arranged to be non-mutually inductive, and a rotor coil in said governing means mechanically coupled to said fuel throttle.

SIEGFRIED HANSEN.